US006967225B2

(12) United States Patent
Mcenhill et al.

(10) Patent No.: US 6,967,225 B2
(45) Date of Patent: Nov. 22, 2005

(54) SCRATCH-RESISTANT POLYPROPYLENE COMPOSITION

(75) Inventors: Corey S. Mcenhill, Dublin, OH (US); Bryan T. Cerra, Hillard, OH (US); Patty Scott, Galloway, OH (US); Youichi Kawai, Troy, OH (US); Shigemi Sakumoto, Sidney, OH (US); Hiroyuki Toshino, Tipp City, OH (US)

(73) Assignees: Honda Motor Co., Ltd., Tokyo (JP); Advanced Composites, Inc., Sidney, OH (US)

(*) Notice: Subject to any disclaimer, the term of this patent is extended or adjusted under 35 U.S.C. 154(b) by 21 days.

(21) Appl. No.: 10/832,584

(22) Filed: Apr. 26, 2004

(65) Prior Publication Data
US 2005/0154101 A1 Jul. 14, 2005

Related U.S. Application Data

(60) Provisional application No. 60/467,600, filed on May 5, 2003.

(51) Int. Cl.[7] ............................. C08K 5/20; C08L 51/00
(52) U.S. Cl. ...................... 524/232; 524/451; 524/504
(58) Field of Search ............................... 524/232, 451, 524/504

(56) References Cited

U.S. PATENT DOCUMENTS

| 5,391,618 | A  | 2/1995  | Yamamoto et al.   |
| 5,576,374 | A  | 11/1996 | Betso et al.      |
| 5,639,829 | A  | 6/1997  | Yamaguchi et al.  |
| 5,936,037 | A  | 8/1999  | Tasaka            |
| 6,300,419 | B1 | 10/2001 | Sehanobish et al. |
| 6,326,433 | B1 | 12/2001 | Wang et al.       |
| 6,329,465 | B1 | 12/2001 | Takahashi et al.  |
| 6,486,234 | B1 | 11/2002 | Nakamura et al.   |

OTHER PUBLICATIONS

Cho, Y., Go, J., Lee, W., Lee, J., Cho, W., Ha, C.; Miscibility Improvement in PP and EPDM Blends via Introducing Specific Interaction; Elastomer, vol. 35, No. 1, p. 46 (2000), available at http://www.rubber.or.kr/english/thesis/thesis6.htm; Korean Institute of Rubber Institute, S. Korea.
Thayer, A, M,; Metallocene Catalysts Initiate New Era In Polymer Synthesis; Chemical & Engineering News, Sep. 11, 1995, available at http://pubs.acs.org/hotartcl/cenear/950911/art01.html; American Chemical Society, Columbus, Ohio, US.

Primary Examiner—Peter D. Mulcahy
(74) Attorney, Agent, or Firm—Fitch, Even, Tabin & Flannery; Mark E. Duell

(57) ABSTRACT

The invention relates to polypropylene compositions, methods of preparing the polypropylene compositions, and methods of producing molded or extruded articles of the polypropylene composition. In one embodiment, the polypropylene composition contains: (a) about 60 to about 65 wt. % of a polypropylene resin; (b) about 10 to about 15 wt. % of an ethylene-alpha-olefin copolymer rubber; (c) about 20 to about 25 wt. % talc; (d) about 0.5 to about 3.0 wt. % of a grafted polypropylene resin; (e) about 0.2 to about 0.5 wt. % of an unsaturated fatty acid amide; and (f) about 0.2 to about 0.5 wt. % scratch-resistant agent, all based on the weight of the polypropylene composition. The scratch-resistant agent contains about 30 to about 50 wt. % of an ethylene vinyl acetate, and about 50 to about 70 wt. % of an aliphatic petroleum resin, based on the weight of the scratch-resistant agent. In another aspect, the invention relates to a process for preparing the polypropylene composition described above. In a further aspect, the invention involves a method of molding or extruding the polypropylene composition described above. In yet a further aspect, the invention includes molded or extruded articles of the polypropylene composition described above. The polypropylene compositions of the invention are especially useful in the preparation of molded objects and articles requiring superior scratch resistance.

21 Claims, 3 Drawing Sheets

SCRATCH-RESISTANT POLYPROPYLENE COMPOSITION

CROSS-REFERENCE TO RELATED APPLICATIONS

The present application claims benefit from earlier filed U.S. Provisional Application No. 60/467,600, filed May 5, 2003, which is incorporated herein in its entirety by reference for all purposes.

FIELD OF THE INVENTION

This invention relates to polypropylene compositions with improved scratch-resistant properties. This invention relates particularly to a polypropylene composition containing a polypropylene resin, an ethylene-alpha-olefin copolymer rubber, talc, a grafted polypropylene resin, an unsaturated fatty acid amide, and a scratch-resistant agent. The polypropylene composition demonstrates improved scratch resistance, especially when used in injection-molded articles, such as those found in automotive interiors.

BACKGROUND OF THE INVENTION

Polypropylene has been used in many applications in the form of molded articles, film, sheet, etc., because it is excellent in molding processability, toughness, moisture resistance, gasoline resistance, chemical resistance, has a low specific gravity, and is inexpensive. The use of polypropylene is expanding at an increasing rate in the fields of exterior and interior automotive trims, in electrical equipment device housing and covers as well as household and personal articles.

However, polypropylene is poor or inadequate in heat resistance, stiffness, scratch resistance and impact resistance. These deficiencies are obstacles to opening up new applications for polypropylene, particularly applications which have traditionally been injection molded. In order to overcome these shortcomings, especially inadequate impact resistance, polypropylene has been blended with a rubbery elastic material such as ethylene-propylene copolymer rubber, ethylene-propylene-diene copolymer rubber or ethylene-butene copolymer rubber. For example, U.S. Pat. No. 5,391,618 discloses low crystalline polypropylene polymer compositions containing an ethylene-alpha-olefin copolymer. Additionally, U.S. Pat. No. 5,576,374 describes polypropylene polymer compositions with a substantially linear ethylene polymer. Another example, U.S. Pat. No. 5,639,829, discloses propylene polymer compositions containing an ethylene and 1-butene random copolymer. Each of these patents is incorporated herein by reference.

To achieve a good balance of stiffness and toughness, U.S. Pat. No. 6,300,419, incorporated herein by reference, employs compositions containing a high crystalline polypropylene, a substantially linear ethylene polymer, a filler, an additional polymer, and a slip agent, such as an unsaturated fatty acid amide. Scratch resistance, while addressed in these earlier patents, has not yet been improved in a manner sufficient to satisfy the current demand in the automotive and other relevant industries. Accordingly, a need exists in the art for a polypropylene composition that overcomes such shortcomings while also providing superior scratch resistance. This invention answers that need.

BRIEF DESCRIPTION OF THE DRAWINGS

In FIGS. 1–3, Additive B corresponds to component (d) of the polypropylene composition; Additive D corresponds to component (e) of the polypropylene composition; and Additive E corresponds to component (f) of the polypropylene composition. In the drawings:

FIG. 1 is a bar graph illustrating the effects of Additives D, B, and E in various combinations;

FIG. 2 is a line graph illustrating the Additive E content versus the scratch resistance of a composition; and FIG. 3 is a line graph illustrating the Additive E content versus the flexural modulus of a composition.

SUMMARY OF THE INVENTION

Figure 1:
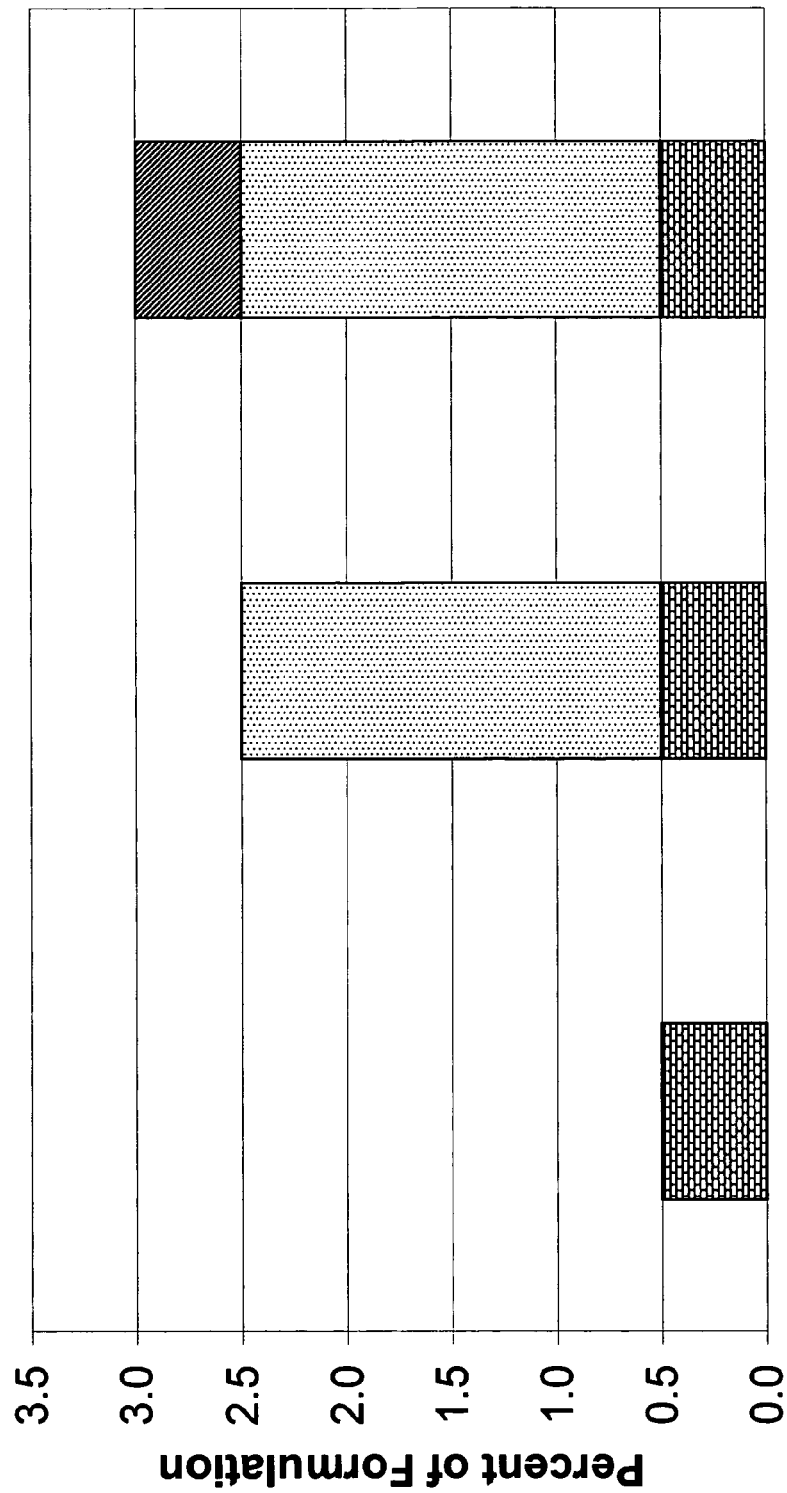
FIGS. 1–3 depict graphs and charts illustrating the effects of various combinations of components in the polypropylene composition.

The invention relates to polypropylene compositions, methods of preparing the polypropylene compositions, and methods of producing molded or extruded articles of the polypropylene composition.

In one embodiment, the polypropylene composition contains: (a) about 60 to about 65 wt. % of a polypropylene resin; (b) about 10 to about 15 wt. % of an ethylene-alpha-olefin copolymer rubber; (c) about 20 to about 25 wt. % talc; (d) about 0.5 to about 3.0 wt. % of a grafted polypropylene resin; (e) about 0.2 to about 0.5 wt. % of an unsaturated fatty acid amide; and (f) about 0.2 to about 0.5 wt. % scratch-resistant agent, all based on the weight of the polypropylene composition. The scratch-resistant agent contains about 30 to about 50 wt. % of an ethylene vinyl acetate, and about 50 to about 70 wt. % of an aliphatic petroleum resin, based on the weight of the scratch-resistant agent.

In another aspect, the invention relates to a process for preparing the polypropylene composition described above. In a further aspect, the invention involves a method of molding or extruding the polypropylene composition described above. In yet a further aspect, the invention includes molded or extruded articles of the polypropylene composition described above. The polypropylene compositions of the invention are especially useful in the preparation of molded objects and articles requiring superior scratch resistance. Such properties are particularly desired for exterior and interior automotive parts, electrical equipment device housing and covers, other household and personal articles, lawn and garden furniture, and building and construction sheet.

DETAILED DESCRIPTION OF THE EMBODIMENTS

One embodiment of this invention is directed towards a polypropylene composition wherein the polypropylene composition contains: (a) about 60 to about 65 wt. % of a polypropylene resin; (b) about 10 to about 15 wt. % of an ethylene-alpha-olefin copolymer rubber; (c) about 20 to about 25 wt. % talc; (d) about 0.5 to about 3.0 wt. % of a grafted polypropylene resin; (e) about 0.2 to about 0.5 wt. % of an unsaturated fatty acid amide; and (f) about 0.2 to about 0.5 wt. % scratch-resistant agent, all based on the weight of the polypropylene composition. The scratch-resistant agent contains about 30 to about 50 wt. % of an ethylene vinyl acetate, and about 50 to about 70 wt. % of an aliphatic petroleum resin, based on the weight of the scratch-resistant agent.

Component (a) in the polypropylene composition is a polypropylene resin. The polypropylene resin preferably constitutes about 60 to about 65 weight percent of the polypropylene composition. Suitable polypropylene resins are well known in the literature and can be prepared by known techniques. The polypropylene resin is preferably a high crystalline polypropylene resin in isotactic form, although other forms can also be used (for example, syndiotactic or atactic). Additionally, the polypropylene resin is preferably a homopolymer of polypropylene or a copolymer, for example, a random or block copolymer, of propylene and one or more alpha-olefin comonomers, preferably a $C_2$ or $C_4$ to $C_{20}$ alpha-olefin. The alpha-olefin should be present in the polypropylene resin in an amount of not more than about 20 percent by mole, preferably not more than about 15 percent, even more preferably not more than about 10 percent and most preferably not more than about 5 percent by mole.

Examples of the $C_2$ and $C_4$ to $C_{20}$ alpha-olefins include, but are not limited to, ethylene, 1-butene, 1-pentene, 1-hexene, 1-heptene, 1-octene, 1-decene, 1-dodecene, 1-hexadodecene, 4-methyl-1-pentene, 2-methyl-1-butene, 3-methyl-1-butene, 3,3-dimethyl-1-butene, diethyl-1-butene, trimethyl-1-butene, 3-methyl-1-pentene, ethyl-1-pentene, propyl-1-pentene, dimethyl-1-pentene, methylethyl-1-pentene, diethyl-1-hexene, trimethyl-1-pentene, 3-methyl-1-hexene, dimethyl-1-hexene, 3,5,5-trimethyl-1-hexene, methylethyl-1-heptene, trimethyl-1-heptene, dimethyloctene, ethyl-1-octene, methyl-1-nonene, vinylcyclopentene, vinylcyclohexene and vinylnorbornene. As can be seen from this exemplary list, the alpha-olefins may be branched. Where the alkyl branching position is not specified, it is generally on position 3 or higher of the alkene.

The polypropylene resin may be prepared by various processes, for example, in a single stage or multiple stages, by such polymerization method as slurry polymerization, gas phase polymerization, bulk polymerization, solution polymerization or a combination thereof. Preparation of the polypropylene resin may also include the use of a catalyst known to those of skill in the art, such as a metallocene catalyst or a Ziegler-Natta catalyst.

Component (b) of the polypropylene composition is an ethylene-alpha-olefin copolymer rubber. The ethylene-alpha-olefin copolymer rubber preferably constitutes about 10 to about 15 weight percent of the polypropylene composition.

Ethylene-alpha-olefin copolymer rubbers may be prepared using titanium, metallocene or vanadium-based catalysts capable of readily polymerizing high molecular weight alpha-olefin copolymers under typical process conditions. Preferably, a metallocene catalyst or titanium chloride is used.

The ethylene-alpha-olefin copolymer rubbers generally contain between about 50 to about 95 weight percent ethylene and about 5 to about 50 weight percent, preferably about 10 to about 25 weight percent, of at least one alpha-olefin comonomer. Typically, the ethylene-alpha-olefin copolymer rubbers are copolymers of ethylene and one or more $C_3$ to $C_{20}$ alpha-olefins, preferably copolymers of ethylene and one or more $C_3$ to $C_{10}$ alpha-olefin comonomers, and more preferably copolymers of ethylene and one or more comonomers selected from the group consisting of propylene, 1-butene, 1-hexene, 4-methyl-1-pentane, and 1-octene. Most preferably, the copolymers are ethylene and propylene copolymers.

When the polypropylene compositions are used for automotive parts, $C_4$–$C_8$ alpha-olefins in the ethylene-alpha-olefin copolymer rubber should preferably be used. Preferred is a composition utilizing ethylene-octene copolymer rubber.

When propylene is used as the alpha-olefin, the propylene content of the rubber is about 33 wt. %, based on the total weight of the rubber. Suitable ethylene-propylene copolymer rubbers are available from commercial suppliers.

The density of the ethylene-alpha-olefin copolymer rubbers is generally equal to or greater than about 0.850 grams per cubic centimeter (g/cc), and preferably equal to or greater than about 0.860 g/cc. The density is also generally less than or equal to about 0.935 g/cc and preferably less than or equal to about 0.900 g/cc. More preferably, the density of the ethylene-alpha-olefin copolymer rubber ranges from about 0.855 to about 0.885 g/cc, preferably from about 0.860 g/cc to about 0.880 g/cc, most preferably from about 0.861 g/cc to about 0.863 g/cc.

The melt flow rate of the ethylene-alpha-olefin copolymer rubbers generally ranges from about 0.5 to about 15 g/10 minutes, measured at 230° C. under a 2.16-kg load. Preferably, the melt flow rate ranges from less than about 8 g/10 minutes, more preferably, less than about 6 g/10 minutes, and especially preferred from less than about 3 g/10 minutes.

The molecular distribution ($M_w/M_n$) of the ethylene-alpha-olefin copolymer rubbers, where $M_w$ is the average molecular weight and $M_n$ is the number average molecular weight, is preferably at least about 1.5 and less than or equal to about 3.5, and more preferably is at least about 1.5 and less than or equal to about 2.0.

Component (c) of the polypropylene composition is talc. The talc preferably constitutes about 20 to about 25 weight percent of the polypropylene composition. Talcs are generally known fillers for various polymeric resins. Any commercially available talc may be used.

Before the talc is added to the polypropylene composition, it may be treated with various surface treatment agents, such as organic titanate coupling agents, silane coupling agents, fatty acids, metal salts of fatty acids, fatty acid esters, and the like. The talc may also be added to the polypropylene composition without surface treatments.

The particle size of the talc should be small enough to provide sufficient mechanical strength to the polypropylene composition, but not so large that the talc will coagulate, causing lower impact strength. The talc generally has a average particle diameter of less than or equal to about 10 micrometers, preferably less than or equal to about 3 micrometers, more preferably less than or equal to about 2 micrometers, and most preferably from about 1 to about 2 micrometers. The average particle diameter may be measured by known methods in the art; for example, the talc may be (a) processed in a centrifuge, and (b) analyzed from optical particle-size distributions using the centrifugal settlement method.

Component (d) of the polypropylene composition is a grafted polypropylene resin. The grafted polypropylene resin preferably constitutes about 0.5 to about 3.0 weight percent of the polypropylene composition.

A preferred graft modification of the polypropylene is achieved with any unsaturated organic compound containing, in addition to at least one ethylenic unsaturation (for example, at least one double bond), at least one carbonyl group(—C═O) and that will graft to a polypropylene resin. Representative of unsaturated organic compounds that contain at least one carbonyl group are the carboxylic acids, anhydrides, esters and their salts, both metallic and nonmetallic. Preferably, the organic compound contains an ethylenic unsaturation conjugated with a carbonyl group. Representative compounds include maleic, fumaric, acrylic, methacrylic, itaconic, crotonic, α-methyl crotonic, and cinnamic acid and their anhydride, ester and salt derivatives, if any. Maleic anhydride is the preferred unsaturated organic compound, making maleic anhydride-grafted polypropylene resin the preferred grafted polypropylene resin. General information on the preparation and use of maleic anhydride-grafted polypropylene is presented in the thesis "Miscibility Improvement in PP and EPDM Blends via Introducing Specific Interaction" by Cho, et al. of Pusan National University and available at the website of the Korean Institute of Rubber Industry at http://www.rubber.or.kr/english/thesis/thesis6.htm, which is hereby incorporated in its entirety for all purposes.

The unsaturated organic compound can be grafted to the polypropylene by any known technique. For example, polypropylene may be introduced into a two-roll mixer and mixed at a temperature of, for example, 60° C. The unsaturated organic compound may then be added along with an optional free radical initiator, such as, for example, benzoyl peroxide. The components may then be mixed at, for example, 30° C. until the grafting is completed. If a higher reaction temperature is used higher, for example, 210° C. to 300° C., a free radical initiator is generally not necessary.

Component (e) of the polypropylene composition is an unsaturated fatty acid amide, which acts as a slip agent. The unsaturated fatty acid amide preferably constitutes about 0.2 to about 0.5 weight percent of the polypropylene composition.

The unsaturated fatty acid amides generally conform to the empirical formula: $R^2C(O)NHR^3$, where $R^2$ is an unsaturated alkyl group having of from 10 carbon atoms to 26 carbon atoms, and $R^3$ is independently hydrogen or a unsaturated alkyl group having of from 10 carbon atoms to 26 carbon atoms. Representative unsaturated fatty acid amides include oleamide, erucamide, linoleamide, and mixtures thereof. Preferably, the unsaturated fatty acid is erucamide, an unsaturated fatty acid amide of the formula $C_{21}H_{41}CONH_2$.

Component (f) of the polypropylene composition is a scratch-resistant agent. The scratch-resistant agent provides the polypropylene composition with superior scratch-resistant properties. The scratch-resistant agent preferably constitutes about 0.2 to about 0.5 weight percent of the polypropylene composition.

The scratch-resistant agent preferably contains about 30 to about 50 weight percent of ethylene vinyl acetate, based on the weight of the scratch-resistant agent, and about 50 to about 70 weight percent of an aliphatic petroleum resin, based on the weight of the scratch-resistant agent; more preferably, the scratch-resistant agent contains about 35 to about 45 weight percent of ethylene vinyl acetate, and about 55 to about 65 weight percent of an aliphatic petroleum resin; and most preferably, the scratch-resistant agent contains about 40 weight percent of ethylene vinyl acetate and about 60 weight percent of an aliphatic petroleum resin.

Any commercially available ethylene vinyl acetate may be used as the above-described component of the scratch-resistant agent. The ethylene vinyl acetate preferably has a molecular weight of less than about 30,000, more preferably, less than about 25,000, and most preferably, about 22,000 or less. The molecular weight of the ethylene vinyl acetate may be measured by known techniques in the art. The ethylene vinyl acetate also preferably contains less than about 5 mole percent vinyl acetate, more preferably, less than about 3 mole percent, and most preferably, about 2 mole percent or less, based on the total moles of ethylene vinyl acetate.

Any aliphatic petroleum resins known to those of skill in the art may be used as the above-described component of the scratch-resistant agent. The aliphatic petroleum resin preferably contains $C_4$–$C_5$ straight-chain aliphatic hydrocarbons in the petroleum resin. In a more preferred embodiment, the petroleum resin contains only $C_4$–$C_5$ straight-chain aliphatic hydrocarbons.

As stated above, the polypropylene composition exhibits superior scratch-resistant properties. As such, an aspect of this invention relates to a polypropylene composition containing polypropylene, an ethylene-alpha-olefin copolymer rubber, talc, a grafted polypropylene resin, an unsaturated fatty acid amide, and a sufficient amount of a scratch-resistant agent composition containing (1) ethylene vinyl acetate containing less than about 5 mol % vinyl acetate and having a molecular weight of less than about 25,000, and (2) a $C_4$–$C_5$ straight-chain aliphatic petroleum resin. The polypropylene composition exhibits improved scratch-resistant properties.

Figure 2:
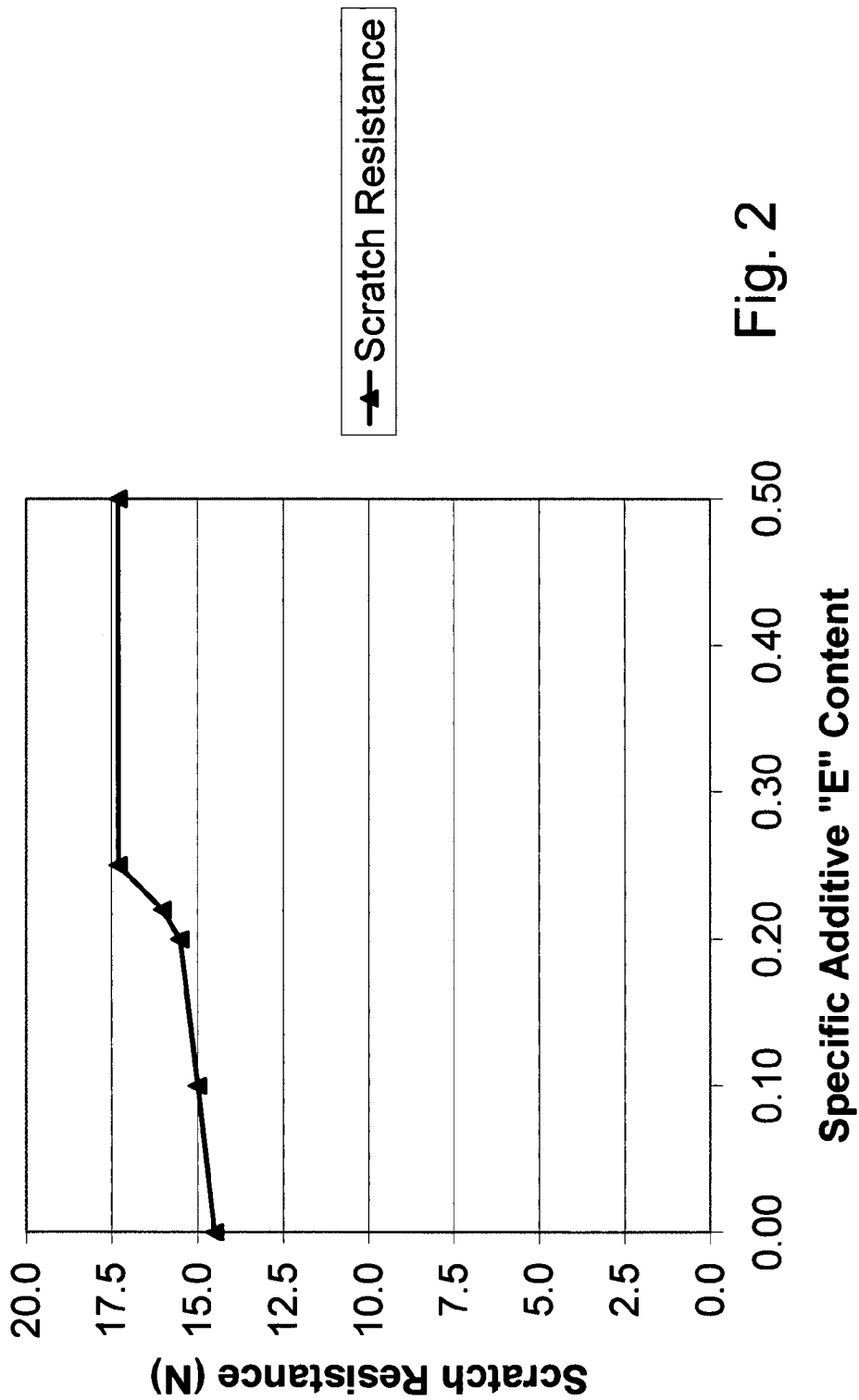
Figure 3:
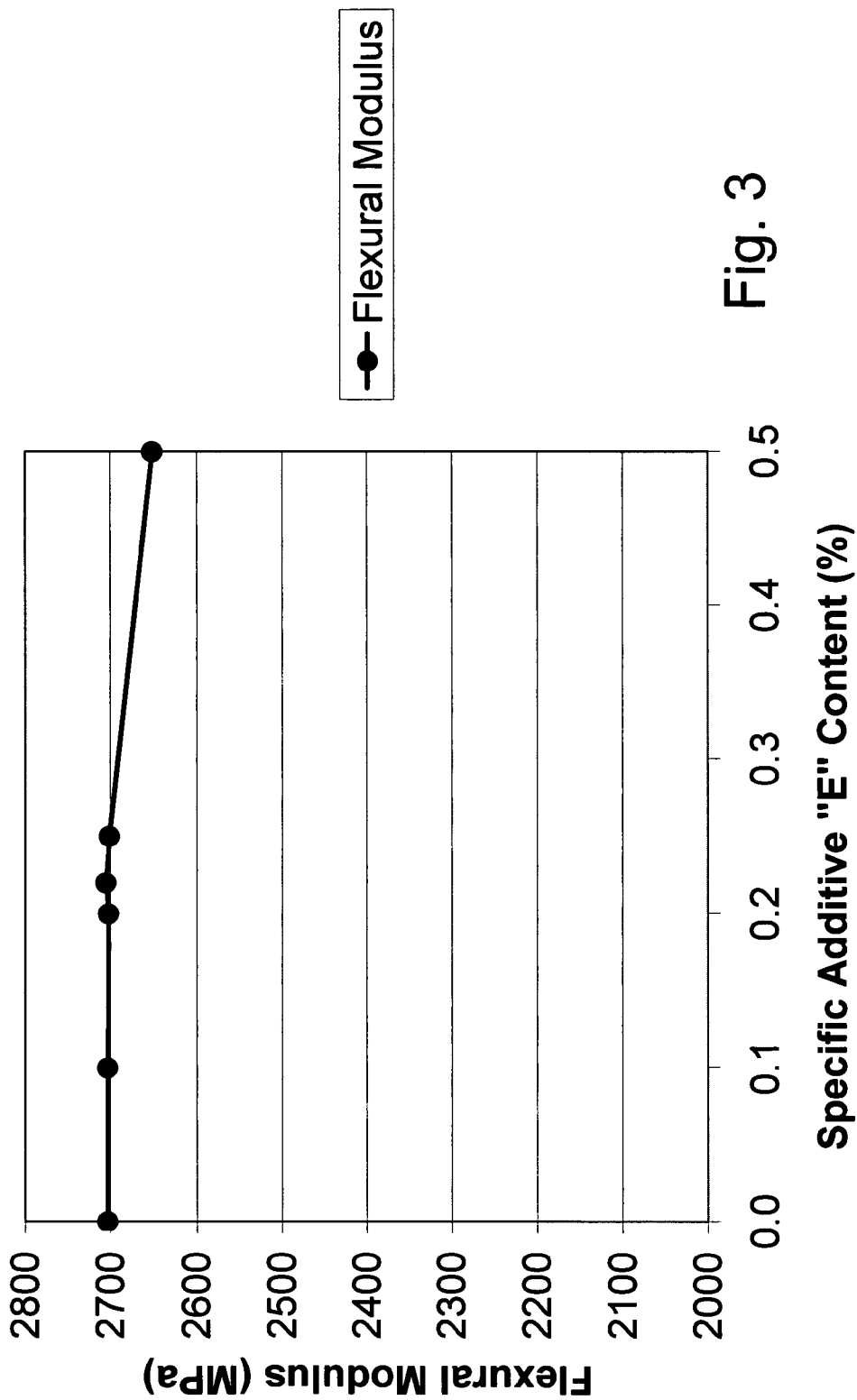

The effects of component (f), and other components, on various physical properties and characteristics of the polypropylene composition are illustrated in FIGS. 1–3. FIG. 1 illustrates that greater than 2.0% of component (d) can produce a polypropylene formulation that has less than desirable tiger stripe properties; that greater than 0.5% of component (e) can produce a polypropylene formulation that has less than desirable fogging characteristics; and that greater than 0.5% of component (f) can produce a polypropylene formulation that has less than desirable flexural modulus properties. FIGS. 2 and 3 illustrate the effect of varying amounts of component (f) in a polypropylene composition containing components (d) and (e) on the properties of scratch resistance and flexural modulus, respectively.

Scratch resistance may be determined by various tests and scales known to those in the art. One such scale is known as the Taber scale. The Taber scratch test subjects test material to a load range of 0 g to 1.0 kg on a turntable moving at a speed of 0.5 to 1.0 rpm utilizing a 58° five mm wide carbide tip. The resistance of the material is evaluated on a five point noticeability scale. On the Taber scale, the polypropylene composition is able to demonstrate a scratch resistance of equal to or greater than about 800 g.

Another well-known test to determine scratch resistance is the five-finger test. On the five-finger test, the polypropylene composition is able to demonstrate a scratch resistance of equal to or greater than about 15 N. The five-finger test is conducted with a load range of 60 g to 2.0 kg at a turntable speed of 100 mm/second. The test tip is stainless steel with a radius of 0.5 mm. The evaluation criteria is scratch propagation and whitening resistance in Newtons. This scratch resistance may increase depending on the color of the material tested. For instance, black or dark-colored polypropylene compositions have shown a scratch resistance greater than 20 N. However, for lighter colored polypropylene compositions, such as those containing lighter colored pigments, such as titanium oxide pigments, a lower scratch resistance has been recorded, generally in the range of 15–17 N.

The polypropylene composition may also contain an additional polymer, which is a resin other than any of components (a)–(f) above. Preferred additional polymers are polyethylene, preferably low density polyethylene (LDPE), linear low density polyethylene (LLDPE), and high density polyethylene (HDPE), polystyrene, polycyclohexylethane, polyesters, such as polyethylene terephthalate, ethylene/styrene interpolymers, syndiotactic PP, syndiotactic PS, ethylene/propylene copolymers, EPDM, and mixtures thereof.

If present, the additional polymer may be employed in amounts of at least about 1 weight percent, preferably at least about 3 weight percent, more preferably at least about 5 weight percent, even more preferably at least about 7 weight percent, and most preferably at least about 10 weight percent, based on the weight of the polypropylene composition.

The polypropylene compositions may also optionally contain one or more additives that are commonly used in polypropylene compositions. Representative additives include, but are not limited to: ignition resistant additives, stabilizers, such as antioxidants and photostablizers, coloring agents, pigments, antioxidants, antistatic agents, dispersing agents, flow enhancers, mold-release agents, such as metal stearates (for example, calcium stearate, magnesium stearate), copper inhibitors, and nucleating agents, including clarifying agents. Preferred additives include ignition resistance additives, such as halogenated hydrocarbons, halogenated carbonate oligomers, halogenated diglycidyl ethers, organophosphorous compounds, fluorinated olefins, antimony oxide and metal salts of aromatic sulfur, and mixtures thereof. Other preferred additives include compounds that stabilize the polypropylene composition against degradation caused by heat, light, and/or oxygen.

If used, such additives may be present in an amount ranging from about 0.01 to about 25 weight percent, preferably from about 0.1 to about 20 weight percent, more preferably from about 1 to about 15 weight percent, more preferably from about 2 to about 12 weight percent, and most preferably from about 5 to about 10 weight percent, based on the total weight of the polypropylene composition.

Another embodiment of this invention relates to the preparation of a polypropylene composition. A method for preparing a polypropylene composition involves the step of combining: (a) about 60 to about 65 wt. % of a polypropylene resin; (b) about 10 to about 15 wt. % of an ethylene-alpha-olefin copolymer rubber; (c) about 20 to about 25 wt. % talc; (d) about 0.5 to about 3.0 wt. % of a grafted polypropylene resin; (e) about 0.2 to about 0.5 wt. % of an unsaturated fatty acid amide; and (f) about 0.2 to about 0.5 wt. % scratch-resistant agent, all based on the weight of the polypropylene composition. The scratch-resistant agent contains about 30 about 50 wt. % of an ethylene vinyl acetate, and about 50 to about 70 wt. % of an aliphatic petroleum resin, based on the weight of the scratch-resistant agent.

Preparation of the polypropylene compositions of this invention can be accomplished by any suitable blending or mixing means known in the art. The blending step should, at least minimally, disperse the components amongst each other. The components may be blended together in a one-step process or a multi-step process. In the one-step process, all the components are blended together at the same time. In the multiple-step process, two or more components are blended together to form a first mixture and then one or more of the remaining components are blended with the first mixture. If one or more components still remain, these components may be blended in subsequent mixing steps. Preferably, all the components are blended in a single step.

Additionally, the polypropylene composition may be prepared by dry blending the individual components and subsequently melt mixing, either directly in the extruder used to make the finished article (for example, the automotive part), or pre-mixing in a separate extruder (for example, a banbury mixer). Dry blends of the composition may also be directly injection molded without pre-melt mixing.

Certain portions of the components may also be blended at different steps for improved performance. For example, the polypropylene resin, the ethylene-alpha-olefin copolymer rubber and the grafted polypropylene resin may be blended to form a first mixture. The resin mixture may then be blended with the talc, the unsaturated fatty acid, the scratch-resistant agent, and, if present, any additional components to form a second mixture. As discussed above, other blending and mixing techniques are known to those skilled in the art and may be used.

Another embodiment of this invention relates to a two-step method of producing a molded or extruded article of a polypropylene composition. The first step involves preparing a polypropylene composition containing: (a) about 60 to about 65 wt. % of a polypropylene resin; (b) about 10 to about 15 wt. % of an ethylene-alpha-olefin copolymer rubber; (c) about 20 to about 25 wt. % talc; (d) about 0.5 to about 3.0 wt. % of a grafted polypropylene resin; (e) about 0.2 to about 0.5 wt. % of an unsaturated fatty acid amide; and (f) about 0.2 to about 0.5 wt. % scratch-resistant agent, all based on the weight of the polypropylene composition. The scratch-resistant agent contains about 30 to about 50 wt. % of an ethylene vinyl acetate, and about 50 to about 70 wt. % of an aliphatic petroleum resin, based on the weight of the scratch-resistant agent. The second step of this process involves molding or extruding the polypropylene composition into a molded or extruded article.

When softened or melted by the application of heat, the polypropylene compositions can be formed or molded using conventional techniques known in the art, such as compression molding, injection molding, gas assisted injection molding, hollow molding, sheet molding, rotational molding, laminate molding, calendering, vacuum forming, thermoforming or heat forming, and extrusion. The molding techniques may be used alone or in combination. Preferably, the thermoplastic resin composition is molded via injection molding.

For a typical injection molding method, the preferred barrel temperature ranges from 210° C. (410° F.) to 190° C. (375° F.) (for harder to fill parts, the temperatures may have to be increased), with the lower temperatures in the rear zones to allow venting through the hopper. The preferred melt temperature has a maximum temperature with a hand pyrometer ranging from 190° C. (380° F.) to 230° C. (440° F.) while the mold temperature typically ranges from 25° C. (80° F.) to 40° C. (100° F.). The injection pressure preferably ranges from 50 to 60% of machine capacity, but the pressure should be sufficient to fill the mold without hesitation or flashing. The holding pressure setting should be lower than boost pressure with a minimum amount of time to prevent over-packing of the part. It is preferred to use a slow to medium injection speed to prevent excessive shear on the material. The injection molding process preferably maintains a cushion at 10 to 20 mm to provide enough material for consistent parts. Decompression is preferably used only when necessary to prevent nozzle drool. With regard to screw speed (RPM), the screw should stop 1 to 2 seconds before mold opens—a lower RPM is preferred for mixing and uniform melt temperature. After the injection molding is complete, the molded article is preferably dried for a minimum of two hours at 100° C. (212° F.).

The thermoplastic resin composition may be molded into to any shape or form. Examples of the molded or extruded articles include exterior and interior automotive trims, for example, bumper beams, bumper fascia, pillars, instrument panels and the like; in electrical and electrical equipment device housing and covers; as well as other household and personal articles, including, for example, appliance housings, housewares, freezer containers, and crates; lawn and garden furniture; and building and construction sheet. Preferably, the polypropylene composition is molded into parts that may be used in the interior of an automobile, such as a console, steering column cover, driver lower cover, column cover lower, column cover upper, side cover right, side cover left, center lower cover, center lower garnish, defroster duct, glove box, duct outlet and tailgate lower. Nearly all automotive interior plastic parts may be made from or contain the polypropylene composition to thereby provide the parts with lubricity and lower coefficients of friction.

What is claimed is:

1. A polypropylene composition, comprising:
   a. about 60 to about 65 wt. % of a polypropylene resin, based on the weight of the polypropylene composition;
   b. about 10 to about 15 wt. % of an ethylene-alpha-olefin copolymer rubber, based on the weight of the polypropylene composition;
   c. about 20 to about 25 wt. % talc, based on the weight of the polypropylene composition;
   d. about 0.5 to about 3.0 wt. % of a grafted polypropylene resin, based on the weight of the polypropylene composition;
   e. about 0.2 to about 0.5 wt. % of an unsaturated fatty acid amide, based on the weight of the polypropylene composition; and
   f. about 0.2 to about 0.5 wt. % of a scratch-resistant agent, based on the weight of the polypropylene composition, the scratch-resistant agent comprising:
      i. about 30 to about 50 wt. % of an ethylene vinyl acetate, based on the weight of the scratch-resistant agent; and
      ii. about 50 to about 70 wt. % of an aliphatic petroleum resin, based on the weight of the scratch-resistant agent.

2. The polypropylene composition of claim 1, wherein at least one alpha-olefin of the ethylene-alpha-olefin copolymer rubber is selected from the group consisting of propylene, 1-butene, 1-hexene, 4-methyl-pentene and 1-octene.

3. The polypropylene composition of claim 2, wherein the ethylene-alpha-olefin copolymer rubber is an ethylene-propylene copolymer rubber.

4. The polypropylene composition of claim 1, wherein the talc has an average diameter of less than or equal to about 3 microns.

5. The polypropylene composition of claim 1, wherein the talc has an average diameter of about 1 to about 2 microns.

6. The polypropylene composition of claim 1, wherein the grafted polypropylene resin is maleic anyhdride-grafted polypropylene resin.

7. The polypropylene composition of claim 1, wherein the unsaturated fatty acid amide is selected from the group consisting of oleamide, erucamide, linoleamide, and mixtures thereof.

8. The polypropylene composition of claim 7, wherein the unsaturated fatty acid amide is erucamide.

9. The polypropylene composition of claim 1, wherein the ethylene vinyl acetate has a molecular weight of less than about 25,000.

10. The polypropylene composition of claim 9, wherein the ethylene vinyl acetate comprises less than about 5 mol % vinyl acetate.

11. The polypropylene composition of claim 1, wherein the aliphatic petroleum resin contains $C_4$–$C_5$ straight-chain aliphatic hydrocarbons.

12. The polypropylene composition of claim 1, wherein the ethylene-alpha-olefin copolymer rubber is a ethylene-propylene copolymer rubber, the grafted polypropylene resin is maleic anhydride-grafted polypropylene resin, the unsaturated fatty acid amide is erucamide, the ethylene vinyl acetate contains less than about 5 mol % vinyl acetate and has a molecular weight of less than about 25,000, and the aliphatic petroleum resin is a $C_4$–$C_5$ straight-chain aliphatic petroleum resin.

13. A polypropylene composition comprising polypropylene, an ethylene-alpha-olefin copolymer rubber, talc, a grafted polypropylene resin, an unsaturated fatty acid amide, and a sufficient amount of a composition comprising:
   a. ethylene vinyl acetate containing less than about 5 mol % vinyl acetate and having a molecular weight of less than about 25,000; and
   b. a $C_4$–$C_5$ straight-chain aliphatic petroleum resin;
   to improve the scratch-resistance properties of the polypropylene composition.

14. The polypropylene composition of claim 13, wherein said polypropylene composition exhibits a scratch resistance of about 800 g or greater on the Taber scale.

15. The polypropylene composition of claim 13, wherein said polypropylene composition exhibits a scratch resistance of about 15N or greater on the five-finger test.

16. A method of preparing a polypropylene composition, comprising the step of combining:
   a. about 60 about 65 wt. % of a polypropylene resin, based on the weight of the polypropylene composition;
   b. about 10 to about 15 wt. % of an ethylene-alpha-olefin copolymer rubber, based on the weight of the polypropylene composition;
   c. about 20 to about 25 wt. % talc, based on the weight of the polypropylene composition;
   d. about 0.5 to about 3.0 wt. % of a grafted polypropylene resin, based on the weight of the polypropylene composition;
   e. about 0.2 to about 0.5 wt. % of an unsaturated fatty acid amide, based on the weight of the polypropylene composition; and
   f. about 0.2 to about 0.5 wt. % of a scratch-resistant agent, based on the weight of the polypropylene composition, the scratch-resistant agent comprising:
      i. about 30 to about 50 wt. % of an ethylene vinyl acetate, based on the weight of the scratch-resistant agent; and
      ii. about 50 to about 70 wt. % of an aliphatic petroleum resin, based on the weight of the scratch-resistant agent.

17. A method of producing a molded or extruded article of a polypropylene composition, comprising the steps of:
   a. preparing a polypropylene composition comprising:
      i. about 60 to about 65 wt. % of a polypropylene resin, based on the weight of the polypropylene composition;
      ii. about 10 to about 15 wt. % of an ethylene-alpha-olefin copolymer rubber, based on the weight of the polypropylene composition;
      iii. about 20 to about 25 wt. % talc, based on the weight of the polypropylene composition;
      iv. about 0.5 to about 3.0 wt. % of a grafted polypropylene resin, based on the weight of the polypropylene composition;
      v. about 0.2 to about 0.5 wt. % of an unsaturated fatty acid amide, based on the weight of the polypropylene composition; and
      vi. about 0.2 to about 0.5 wt. % of a scratch-resistant agent, based on the weight of the polypropylene composition, the scratch-resistant agent comprising:

(a). about 30 to about 50 wt. % of an ethylene vinyl acetate, based on the weight of the scratch-resistant agent; and (b). about 50 to about 70 wt. % of an aliphatic petroleum resin, based on the weight of the scratch-resistant agent; and b. molding or extruding said polypropylene composition into a molded or extruded article.

18. The method of claim 17, wherein the molded or extruded article is an automotive interior part selected from the group consisting of a console, steering column cover, driver lower cover, column cover lower, column cover upper, side cover right, side cover left, center lower cover, center lower garnish, defroster duct, glove box, duct outlet and tailgate lower.

19. The composition of claim 1 in the form of a molded or extruded article.

20. The composition of claim 12 in the form of a molded or extruded article.

21. A molded or extruded article of claim 19 selected from the group consisting of a console, steering column cover, driver lower cover, column cover lower, column cover upper, side cover right, side cover left, center lower cover, center lower garnish, defroster duct, glove box, duct outlet and tailgate lower.

* * * * *